July 10, 1951  A. R. MAIER  2,560,233
LUBRICATION SYSTEM
Filed May 15, 1946  3 Sheets-Sheet 1

INVENTOR:
AUGUST R. MAIER,
BY:
Donald G. Dalton
HIS ATTORNEY.

INVENTOR:
AUGUST R. MAIER,
BY: Donald G. Dalton
HIS ATTORNEY.

Patented July 10, 1951

2,560,233

UNITED STATES PATENT OFFICE 2,560,233

LUBRICATION SYSTEM

August R. Maier, Oil City, Pa., assignor to Oil Well Supply Company, a corporation of New Jersey Application May 15, 1946, Serial No. 669,739

1 Claim. (Cl. 184—6)

This invention relates to a lubrication system and more particularly to such a system for lubricating bearings. In transmissions and similar devices using chain or gear drives and having bearings which require lubrication, it is desirable to provide either an oil bath and splash system for lubrication or a force feed pump for spraying oil on the parts. If this is not done, it is necessary to provide for separate lubrication of the bearings by means of drilled holes through the shafts, this being an expense and weakening the shafts. In addition, since such parts must be lubricated manually, there is always the possibility that the operator may forget to lubricate them or the lubrication passages may become obstructed or filled with dirt.

In the present installations, oil is not delivered to the parts until after they have been rotating for some time. In many instances, absence of a lubricant for even a short time causes irreparable damage. On the other hand, too much lubricant is often damaging as too little and many of the present systems do not control the amount of lubricant satisfactorily.

It is therefore an object of my invention to provide positive means for lubricating the bearings in a splash or spray lubricating system.

Another object is to provide means for insuring presence of lubricant on the bearings as soon as the parts of the transmission start to rotate.

These and other objects will be more apparent after referring to the following specification and attached drawings, in which.

Figure 1:
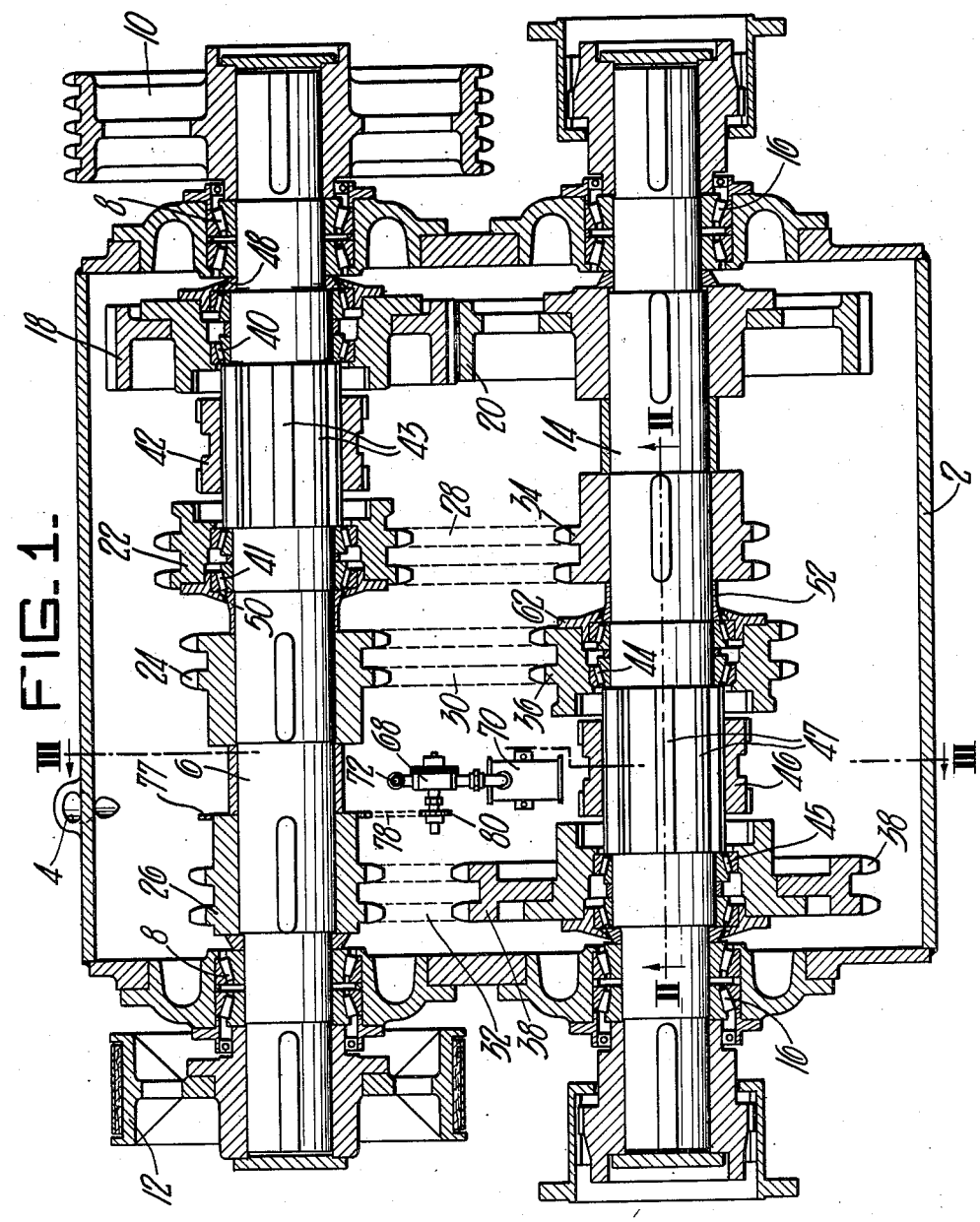
Figure 1 is a horizontal sectional view of the transmission.
Figure 2:
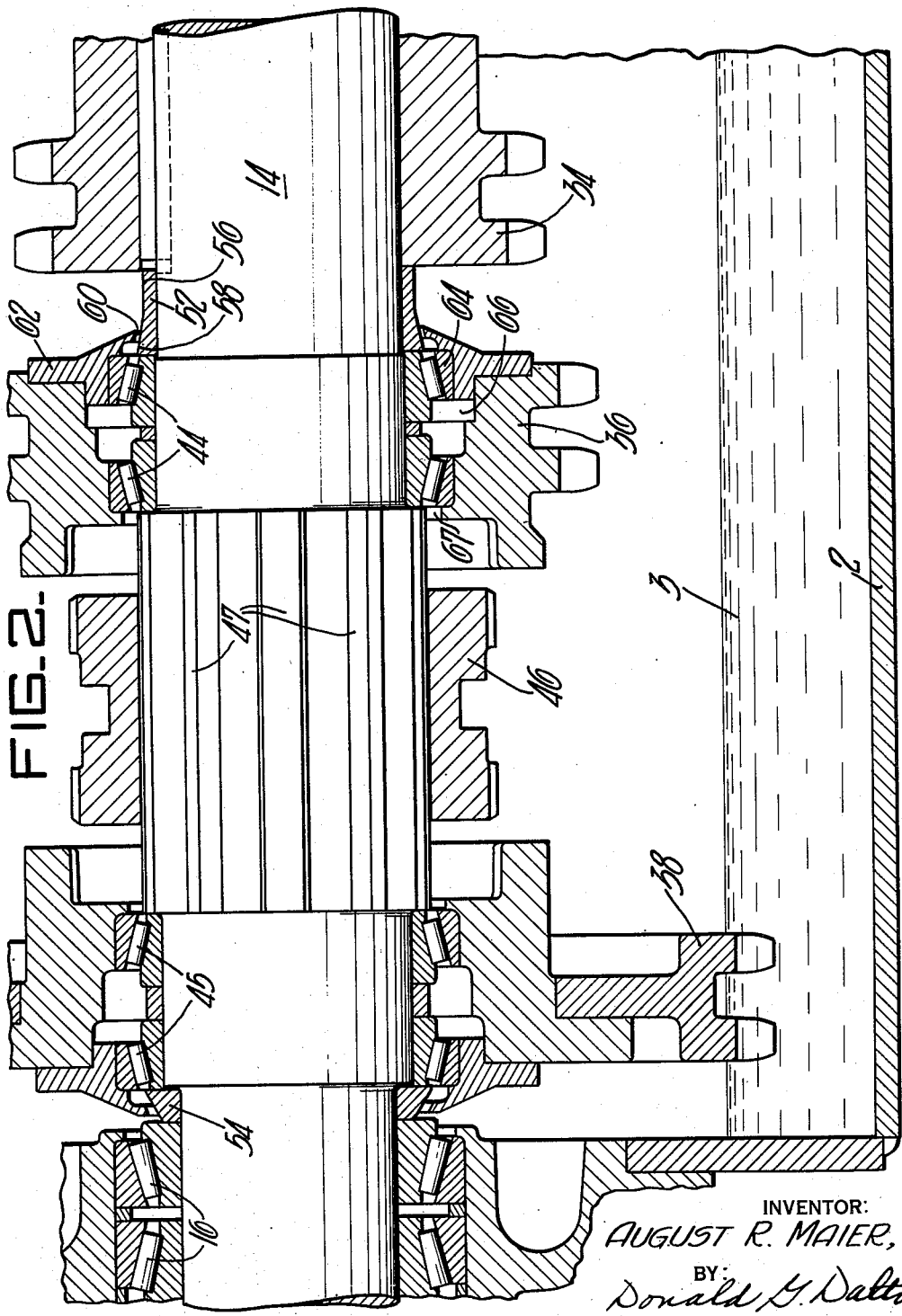
Figure 2 is an enlarged sectional view taken on the line II—II of Figure 1.
Figure 3:
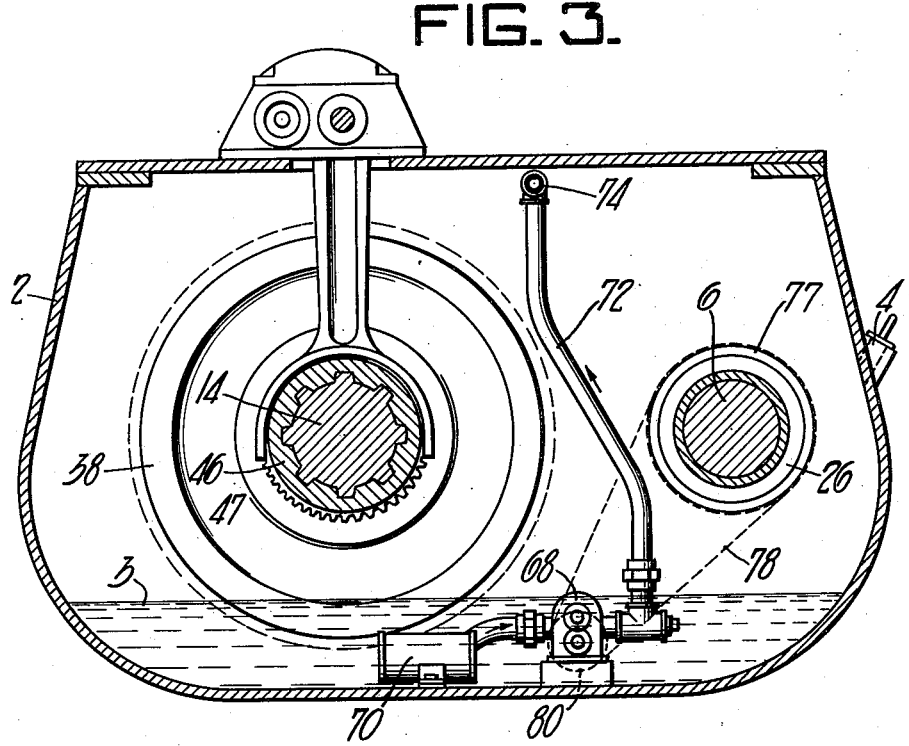
Figure 3 is a sectional view taken on the line III—III of Figure 1.
Figure 4:
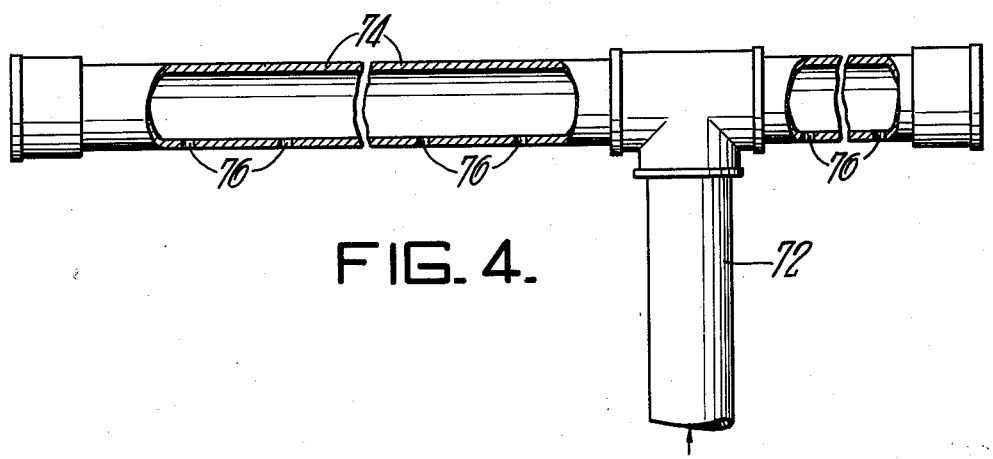
Figure 4 is a view, partly in cross section of the oil distributing manifold.

Referring more particularly to the drawings, the reference numeral 2 indicates the housing of a transmission, the housing being made oil tight so that the bottom thereof serves as a reservoir 3 for oil which is put into the housing through an opening 4. A power shaft 6 is rotatably mounted in the housing on bearings 8 and extends from the housing 2 at both ends thereof, one end supporting a sprocket 10 and the other end supporting a brakeshoe 12. Spaced from the power shaft 6 is an output shaft 14 which is rotatably mounted in bearings 16. The shaft 6 carries a gear 18 which engages a gear 20 on shaft 14 for reverse drive. The shaft 6 also supports sprockets 22, 24 and 26 which are connected by means of chains 28, 30 and 32 with sprockets 34, 36 and 38, respectively, on shaft 14; these being the high, intermediate, and low drive connections, respectively. Gear 18 and sprocket 22 are rotatably mounted on anti-friction bearings 40 and 41, respectively. A double acting clutch 42 is connected to shaft 6 by means of splines 43, movement of the clutch in one direction engaging gear 18 and movement in the other direction engaging sprocket 22. Sprockets 36 and 38 are rotatably mounted on anti-friction bearings 44 and 45, respectively. A double acting clutch 46 is connected to shaft 14 by means of splines 47, movement of the clutch in one direction engaging sprocket 36 and movement in the other direction engaging sprocket 38.

My invention relates to the lubrication of bearings 40, 41, 44 and 45. Tapered spacers or sleeves 48, 50, 52 and 54 are fastened to the shafts 6 and 14 adjacent bearings 40, 41, 44 and 45, respectively. While the various sleeves differ slightly in shape and size, they all operate in the same manner and therefore the description will be limited to the lubrication of the bearing 44 by means of sleeve 52. This sleeve is provided with a cylindrical outer portion 56 which merges with a conical portion 58. The end of the conical portion having the largest diameter extends through a tapered opening 60 in the bearing cap 62 which is fastened to the sprocket 36 in any suitable manner. The diameter of the opening 60 is smaller than the minimum diameter of the bearing cup 64 so that when the assembly is at rest, the oil can flow into a reservoir 66 which is formed by sprocket 36, bearing cap 62 and bearing cup 64 to a height sufficiently high to provide lubrication as soon as the shaft begins to rotate. The sprocket 36 has an opening 67 therein of greater diameter than opening 60 so that excess oil from reservoir 66 will flow from it and lubricate the clutch 46. Oil may be supplied to the parts of the transmission by having at least some of the gears and sprockets dipping into the oil reservoir 3 and splashing oil on the various parts of the transmission. This method requires careful supervision of the height of the oil in the reservoir 3 to insure that the correct amount of oil is supplied to the shaft and therefore it is preferred to use a force feed pump 68 which sucks oil from the reservoir 3 through the oil strainer 70 and delivers it through a conduit 72 to a manifold 74 fastened to the cover of housing 2. The manifold 74 has a plurality of holes 76 therein through which oil is sprayed on the parts of the transmission. Keyed to the hub of sprocket 26 is a sprocket 77 which is connected by a chain 78 to a sprocket 80 mounted on the shaft of pump 70. When using a force feed pump, the level of oil in reservoir 3 is preferably kept low enough to prevent the gears and sprockets from dipping into it.

The operation of the device is as follows:

As soon as the shaft 6 starts to rotate, oil is splashed or sprayed onto the shafts and other transmission parts, either by the gears dipping into the oil reservoir 3 or by the sprocket 77 driving the pump 68. The sleeve 52 rotates with the shaft 14 and any oil which comes in contact therewith is automatically conducted to the bearing enclosure since the largest diameter of the tapered sleeve is located inside the bearing cap 62 and since the lubricant seeks the maximum diameter of the sleeve because of centrifugal action. Since the shaft 14 is substantially horizontal, any lubricant adhering to the sleeve 52 tends to drain to the lowest point on the bottom of the sleeve which is the maximum diameter of the taper. The oil fills reservoir 66 and remains therein when rotation of the shaft 14 stops. As soon as rotation resumes, the bearing is immediately lubricated by the oil in reservoir 66. The tapered sleeve may also be used in conjunction with vertical shafts to provide lubrication at all times during rotation of the shafts.

While one embodiment of my invention has been shown and described, it will be apparent that other adaptations and modifications may be made without departing from the scope of the following claim.

I claim:

A lubrication system comprising a housing, an oil reservoir in the bottom of said housing, a substantially horizontal rotatable shaft mounted in said housing, a tapered sleeve mounted on said shaft for rotation therewith, means for spraying oil from said reservoir onto said sleeve, a bearing cup mounted around said shaft, a rotatable bearing cap adjacent said bearing cup, said cap having an opening therein for receiving the large end of said tapered sleeve, said opening being tapered in the same direction as said tapered sleeve, said cap and sleeve being rotatable with respect to each other, and a member mounted around the bearing cup and cap and cooperating therewith to form an oil reservoir.

AUGUST R. MAIER.

REFERENCES CITED

The following references are of record in the file of this patent:

UNITED STATES PATENTS

| Number | Name | Date |
|---|---|---|
| 1,429,466 | Turnbull | Sept. 19, 1922 |
| 2,046,092 | Rosendahl | June 30, 1936 |
| 2,049,234 | Thomas | July 28, 1936 |
| 2,053,542 | Vandervoort | Sept. 8, 1936 |
| 2,235,793 | Berger | Mar. 18, 1941 |
| 2,302,948 | Hamilton | Nov. 24, 1942 |
| 2,335,557 | Winther | Nov. 30, 1943 |

FOREIGN PATENTS

| Number | Country | Date |
|---|---|---|
| 321,997 | Great Britain | Nov. 28, 1929 |